No. 694,505. Patented Mar. 4, 1902.
J. C. WANDS.
ROLLER SIDE BEARING.
(Application filed Oct. 16, 1901.)
(No Model.)
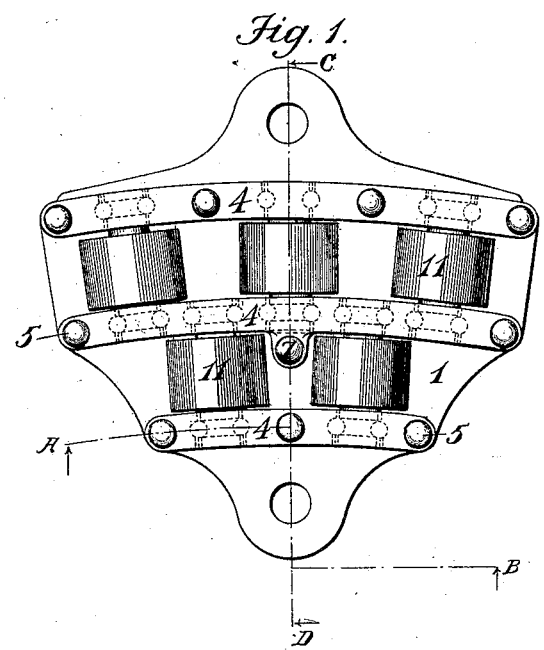
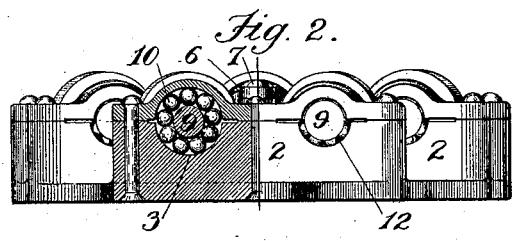
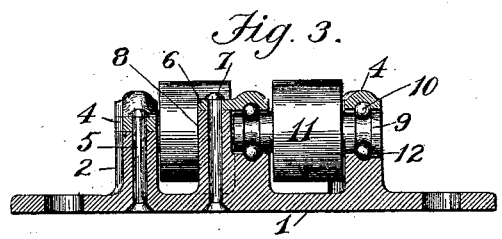
Witnesses.
O. A. Thelin.
George Bakewell
Inventor:
John C. Wands
by Bakewell & Cornwall
Attys.

UNITED STATES PATENT OFFICE.

JOHN C. WANDS, OF ST. LOUIS, MISSOURI.

ROLLER SIDE BEARING.

SPECIFICATION forming part of Letters Patent No. 694,505, dated March 4, 1902.

Application filed October 16, 1901. Serial No. 78,818. (No model.)

*To all whom it may concern:*

Be it known that I, JOHN C. WANDS, a citizen of the United States, residing at the city of St. Louis, State of Missouri, have invented a certain new and useful Improvement in Roller Side Bearings, of which the following is a full, clear, and exact description, such as will enable others skilled in the art to which it appertains to make and use the same, reference being had to the accompanying drawings, forming part of this specification, in which—

Figure 1 is a top plan view of my improved roller side bearing. Fig. 2 is a sectional view on line A B, Fig. 1. Fig. 3 is a sectional view on line C D, Fig. 1.

This invention relates to a new and useful improvement in roller side bearings and is designed especially for use in connection with street-cars, where the travel of the body-bolster bearing is considerable, due to the short radii of the curves in the track.

The object of my present invention is to simplify the construction of roller side bearings, reducing the height of the same, so that they can be used in existing types of rolling-stock, and, further, to provide ball-bearings for the rollers, whereby an effective antifriction side bearing is produced.

Another object is to arrange the axes of rotation of the several rollers radial to the king-pin of the truck and provide a plurality of journals, whereby the axles of the several rollers are supported close to the rollers, the rollers being staggered with respect to each other. The purpose of staggering and making the rollers short in length is to avoid coning the rollers to compensate for the travel in an arc of a circle of the bearing on the body-bolster. In my present construction the rollers are of the same diameter and practically counterparts of each other. These rollers are preferably loosely mounted on their spindles, and the spindles are journaled in ball-bearings, whereby said parts are independently rotatable, and in the event that either of said parts becomes locked against rotation by reason of corrosion or other causes the other rotatable part will enable the roller at least to rotate, and thus prevent flat faces on the roller.

Another object of my invention is to simplify the construction of devices of this character by avoiding the necessity of providing special means for the introduction and removal of the balls from their respective races. My construction contemplates a groove in the spindle, in which the balls bear and run, and a continuous groove formed by the cap-piece and bottom casting, in which the balls are arranged and are free to run. The cap-piece is riveted in position, and when the balls are in place it is impossible for them to become disarranged or get lost.

With these objects in view my invention consists in the construction, arrangement, and combination of the several parts, all as will hereinafter be described and afterward pointed out in the claims.

In the drawings the main or base casting, preferably of malleable iron, consists of a bottom plate 1, provided with perforated lugs or ears, by which the same may be secured to the bolster. Rising from this plate is a plurality of walls or ridges 2, preferably concentric to the king-pin of the truck and in whose upper faces are semicircular recesses formed with ball-races 3. In order to make these races hard to resist wear of the balls, the casting may be chilled at this point by covering the surface with fire-clay before introducing the casting into the muffle, or separate and removable hard-steel ball-races may be inserted, as will be well understood.

4 indicates a cap or covering strap, formed with semicircular recesses designed to register with those before-mentioned, said recesses being also provided with grooves forming ball-races, and these grooves are likewise preferably chilled, or, if desired, a removable race may be employed.

5 indicates rivets employed for securing the straps in position, said rivets preferably extending through the base-plate, as shown. The strap for the intermediate wall is provided with an offset 6, so that a rivet 7 may be introduced therethrough and through a post 8 for holding the middle portion of this strap in position.

9 indicates the spindles of the rollers, which are provided with grooves in their ends, said grooves serving as ball-races and being preferably curved, as are also the grooves in the walls 2 and the cap-pieces, whereby an increased apex bearing of the balls 10 is afforded. These spindles may be integral with the rollers 11, or said rollers may be loosely arranged on the spindles for purposes hereinbefore referred to. Where the spindles are integral with the rollers, the balls will take up the slight end thrust of the spindles; but in the event that the rollers are loose on the spindles the rollers are free to move longitudinally a short distance, and this play tends to keep the parts from becoming locked together.

In assembling the bearing the balls are arranged in the groove on the end of the spindle by means of a suitable templet or temporary bearing, which will expose the balls, after which a thin rubber band is sprung over the balls, which band holds the balls in position on the spindle and enables the roller, its spindles, and carried balls to be inserted in position in the semicircular recess in the wall of the casting. After this the cap-pieces are riveted in place and the elastic band, being thin, will permit the balls to rupture or break the band in the application of the cap-piece. When the cap-piece is in position, the rubber band may be removed by an instrument introduced into a space 12, which space is preferably provided in the outer faces of the walls. However, with respect to this the band may be removed by submerging the bearing in benzin or other solvent, if desired.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a side bearing for cars, the combination with supporting-walls, of a plurality of rollers journaled in said walls, the axes of rotation of said rollers being radial to the king-pin of the truck, caps over the spindles of said rollers, ball-races formed in said caps and in the supporting-walls, and balls in said races; substantially as described.

2. In a side bearing for cars, the combination with supporting-walls formed with ball-races, of a plurality of rollers journaled in said supporting-walls and whose axes of rotation are radial to the king-pin of the truck, ball-bearings for the spindles of said rollers, and a cap-piece extending over a plurality of spindles, said cap-piece being formed with ball-races registering with the races in the supporting-walls; substantially as described.

3. In a side bearing for cars, the combination with supporting-walls provided with ball-races, of cap-pieces also provided with ball-races, a roller, a spindle for said roller whose ends are provided with grooves forming ball-races, and balls in said races; substantially as described.

4. An article of manufacture consisting of a roller having a grooved spindle, of balls arranged in said groove, and a flexible band for holding said balls in position; substantially as described.

5. In a side bearing for cars, the combination with a spindle provided with a groove, of balls in said groove, a flexible band for confining said balls in position, a ball-race into which said balls are introduced, and means for removing said flexible confining-band; substantially as described.

6. In a side bearing for cars, the combination with a roller provided with a grooved spindle, of balls arranged in the groove of said spindle, a flexible band for confining said balls in position, a divided bearing coöperating with said balls, means for securing the parts of said bearing together, and means for removing said flexible confining-band; substantially as described.

7. In a side bearing for cars, the combination with a plurality of walls, of rollers journaled in said walls, said rollers being staggered with relation to each other and having independent spindles, and ball-bearings for the spindles of each roller; substantially as described.

8. In a side bearing for cars, the combination with a base-plate provided with a plurality of walls whose upper edges are formed with semicircular grooved recesses, cap-pieces having registering grooved recesses, rollers whose spindles are received by said recesses, and balls arranged in said recesses around the spindles of the rollers; substantially as described.

9. In a side bearing for cars, the combination with a base-plate 1 provided with walls 2, said walls having recesses 3 in their upper edges, cap-pieces 4 arranged on the upper edges of the walls, rivets for securing said cap-pieces in position, staggered rollers whose axes of rotation are radial to the king-pin of the truck; substantially as described.

10. In a side bearing for cars, the combination with a base-plate 1, of integral walls 2 rising therefrom and concentric to the king-pin of the truck, rollers mounted between said walls, said rollers being staggered with relation to each other, and the axes of rotation of said rollers being radial to the king-pin of the truck, and caps secured in position on top of said walls, said caps being coextensive in length with said walls; substantially as described.

11. In a side bearing for cars, the combination with supporting-walls, of a roller finding a bearing therein, balls arranged in races around the ends of the spindles of the roller, said walls being provided with spaces 12; substantially as described.

12. The herein-described method of assembling the ball-bearings which consists in grouping the balls in position on one of the elements of the bearing holding said balls in place by a flexible band, assembling the bearing, and removing the flexible band; substantially as described.

13. The herein-described method of inserting the balls in ball-bearings which consists in grouping the balls in position around the spindle or axle and holding said balls in place by the use of a rubber band, inserting the axle and its grouped balls in position, and then dissolving the rubber band; substantially as described.

In testimony whereof I hereunto affix my signature, in the presence of two witnesses, this 14th day of October, 1901.

JOHN C. WANDS.

Witnesses:
GEORGE BAKEWELL,
RALPH KALISH.